United States Patent
Edgar

(10) Patent No.: US 9,462,872 B2
(45) Date of Patent: Oct. 11, 2016

(54) PRINTER HEAD WITH PRISM FOR SENSING

(71) Applicant: TCMS Transparent Beauty LLC, Austin, TX (US)

(72) Inventor: Albert D. Edgar, Austin, TX (US)

(73) Assignee: TCMS Transparent Beauty, LLC, Austin, TX (US)

( * ) Notice: Subject to any disclaimer, the term of this patent is extended or adjusted under 35 U.S.C. 154(b) by 0 days.

(21) Appl. No.: 14/422,826

(22) PCT Filed: Aug. 22, 2013

(86) PCT No.: PCT/US2013/056186
§ 371 (c)(1),
(2) Date: Feb. 20, 2015

(87) PCT Pub. No.: WO2014/035793
PCT Pub. Date: Mar. 6, 2014

(65) Prior Publication Data
US 2015/0237991 A1      Aug. 27, 2015

Related U.S. Application Data

(60) Provisional application No. 61/743,108, filed on Aug. 27, 2012.

(51) Int. Cl.
*A45D 40/26* (2006.01)
*A45D 34/04* (2006.01)
*A45D 40/18* (2006.01)
*A45D 44/00* (2006.01)
(Continued)

(52) U.S. Cl.
CPC ............... *A45D 40/26* (2013.01); *A45D 34/04* (2013.01); *A45D 40/18* (2013.01); *A45D 44/00* (2013.01); *A45D 44/005* (2013.01); *A45D 2034/005* (2013.01); *A45D 2044/007* (2013.01); *G03B 15/14* (2013.01)

(58) Field of Classification Search
USPC ............................................................ 396/14
See application file for complete search history.

(56) References Cited

U.S. PATENT DOCUMENTS

| 7,890,152 B2 * | 2/2011 | Edgar ................. A45D 44/005 347/1 |
| 8,026,942 B2 | 9/2011 | Payonk et al. |

(Continued)

OTHER PUBLICATIONS

International Search Report and Written Opinion issued in PCT/US2013/046186 on Dec. 12, 2013.

(Continued)

*Primary Examiner* — W B Perkey
*Assistant Examiner* — Dennis Hancock
(74) *Attorney, Agent, or Firm* — Fish & Richardson P.C.

(57) ABSTRACT

Implementations of the present disclosure provide devices including a camera that is operable to provide images, a deposition head, the deposition head being configured to selectively deposit the RMA to the area of skin, and being positioned to at least partially obscure the area of skin relative to a viewing field of the camera, and a prism attached to the deposition head, the prism being configured to direct light reflected from the area of skin to first camera to enable the camera to generate images of the area of skin. Accordingly, the deposition head is able to physically occupy a column directly over the area of skin, while the camera is able to view the area of skin through the prism. In some examples, prism surfaces can be curved to provide a telecentric view of the area of skin.

10 Claims, 2 Drawing Sheets

(51) Int. Cl.
   *A45D 34/00*         (2006.01)
   *G03B 15/14*         (2006.01)

(56)         References Cited

U.S. PATENT DOCUMENTS 8,182,425    B2     5/2012   Stamatas et al.
   2010/0047733 A1*   2/2010   Nahlieli .................. A61B 1/018
                                                                433/29
   2010/0114265 A1    5/2010   Lechthaler 2012/0029417 A1*   2/2012   Samain .................... A61K 8/49
                                                                604/20

OTHER PUBLICATIONS

International Search Report and Written Opinion issued in PCT/US2013/056186 on Dec. 12, 2013, 1 page.
International Preliminary Report on Patentability issued in PCT/US2013/056186, Mar. 12, 2015, 5 pages.

* cited by examiner

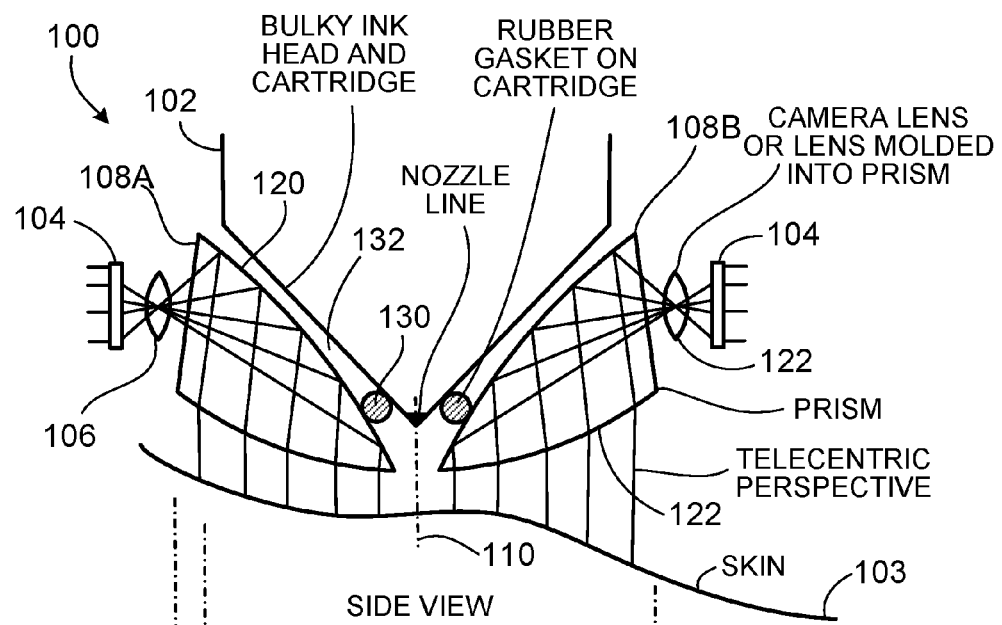
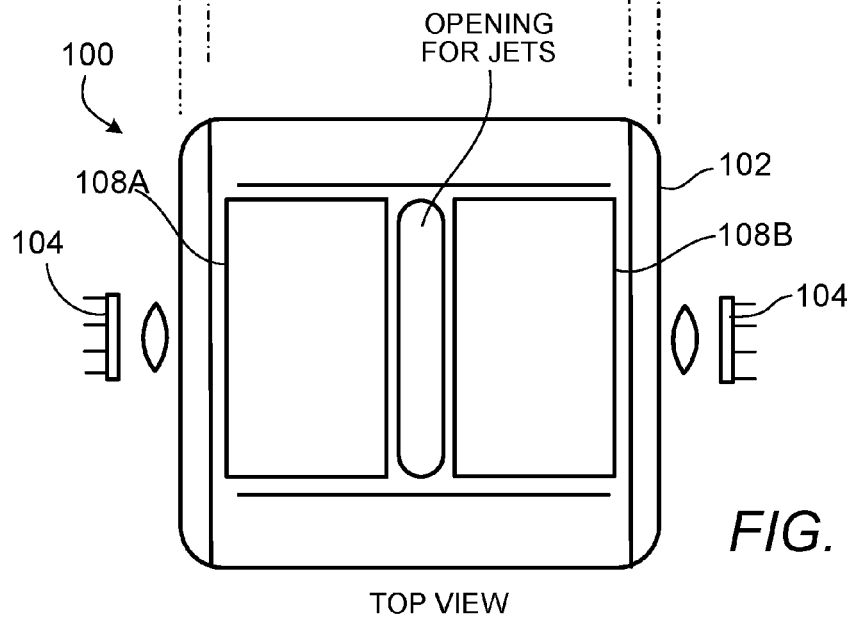

PRINTER HEAD WITH PRISM FOR SENSING

CROSS-REFERENCE TO RELATED APPLICATIONS

This application claims priority to U.S. Prov. App. No. 61/743,108, the disclosure of which is expressly incorporated herein by reference in the entirety.

BACKGROUND

Manual cosmetic applications are imprecise compared to computer-controlled techniques, and this imprecision may make them less effective. For example, the heavy application of a foundation base for makeup may cause an unattractive, caked-on appearance. The selective, precise application of reflectance modifying agents (RMAs) through computer-controlled techniques can provide a more effective, more automated, and less expensive modification of the appearance of skin.

There is a need to make such computer-controlled techniques fast and, precise, and well able to create desired effects, especially for a device moved by a user in a random direction.

SUMMARY

Implementations of the present disclosure include devices for selectively applying a reflectance modifying agent (RMA) to an area of skin. In some implementations, devices include a first camera that is operable to provide images, a deposition head, the deposition head being configured to selectively deposit the RMA to the area of skin, and being positioned to at least partially obscure the area of skin relative to a viewing field of the first camera, and a first prism attached to the deposition head, the first prism being configured to direct light reflected from the area of skin to the first camera to enable the first camera to generate images of the area of skin.

In some implementations, devices further include a second camera that is operable to provide images, the deposition head being positioned to at least partially obscure the area of skin relative to a viewing field of the second camera, and a second prism attached to the deposition head, the second prism being configured to direct light reflected from the area of skin to the second camera to enable the second camera to generate images of the area of skin.

In some implementations, the first camera and the second are disposed on opposite sides of the deposition head.

In some implementations, the first camera is aimed generally parallel to the area of skin.

In some implementations, the first camera is telecentric to axes of motion of the device.

In some implementations, devices further include a second prism attached to the deposition head, the second prism being configured to direct light reflected from the area of skin to the first camera to enable the first camera to generate images of the area of skin.

In some implementations, the first prism includes a plastic.

In some implementations, devices further include a lens.

In some implementations, the lens is molded into the first prism.

In some implementations, the device includes a handheld device.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides handheld devices for implementing the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

DETAILED DESCRIPTION

Figure 1C:
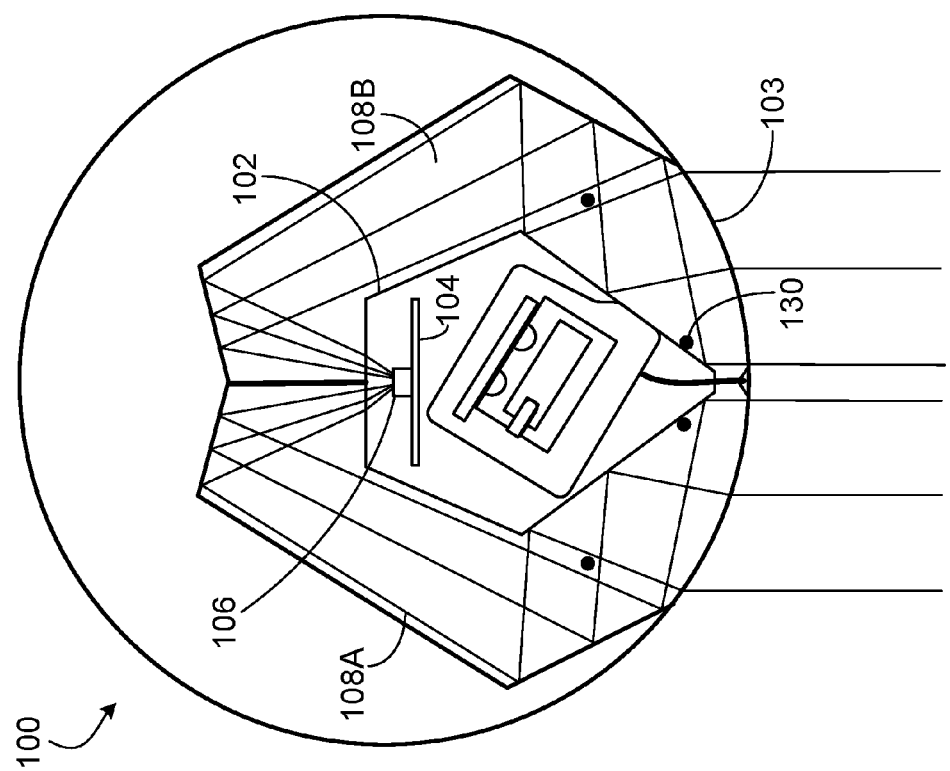
FIGS. 1A and 1B depict respective views of a device in accordance with implementations of the present disclosure.
Figure 1D:
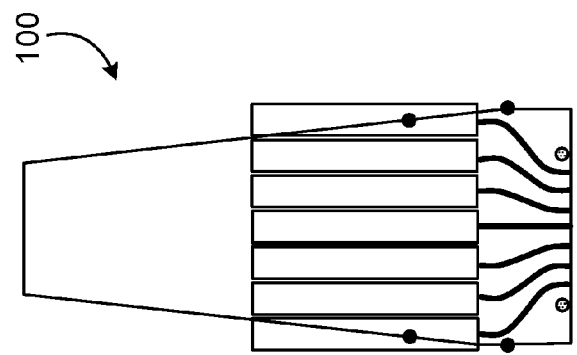

Implementations of the present disclosure generally build on apparatus and methods disclosed in each of U.S. patent application Ser. No. 11/503,806 (US20070035815), entitled "System and Method for Applying a Reflectance Modifying Agent to Improve the Visual Attractiveness of Human Skin," and filed on Aug. 14, 2006, U.S. patent application Ser. No. 12/029,524 (US20080194971), entitled "System and Method for Applying a Reflectance Modifying Agent Electrostatically to Improve the Visual Attractiveness of Human Skin," and filed on Feb. 12, 2008, U.S. patent application Ser. No. 12/028,836 (US20080219528), entitled "System and Method for Providing Simulated Images through Cosmetic Monitoring," and filed on Feb. 11, 2008, U.S. patent application Ser. No. 12/028,835 (US20080193195), entitled "Handheld Apparatus and Method for the Automated Application of Cosmetics and Other Substances," and filed on May Feb. 11, 2008, U.S. patent application Ser. No. 12/029, 534 (US20080192999), entitled "System and Method for Applying a Reflectance Modifying Agent to Change a Person's Appearance Based on a Digital Image," and filed on Feb. 12, 2008, and U.S. patent application Ser. No. 12/129,624 (US20090025747), entitled "Apparatus and Method for the Precision Application of Cosmetics," and filed May 29, 2008. The disclosures of the above-identified patent applications are expressly incorporated herein by reference in their entireties.

In the present disclosure, the term reflectance modifying agent (RMA) refers to any compound useful for altering the reflectance of skin. Examples RMAs can include cosmetics, inks, dyes, pigments, bleaching agents, chemically altering agents, and other substances that can alter the reflectance of human skin and other features. An RMA composition is a composition that includes at least one RMA. An RMA composition can include other ingredients such as a moisturizer, a carrier, or an active ingredient such as a beneficial compound. A transparent RMA can be provided as a dye, although dilute pigmented RMAs are essentially transparent also. An opaque RMA can include high refractive index particles. In one example of pigmented cosmetics, the term "high refractive index particles" refers to particles having a refractive index of 2.0 or greater.

The term frexel is defined as a small pixel-like region of the skin, which may represent a single large pixel or a small number of pixels. More specifically, a frexel refers to the area of the deposition on a surface immediately below the deposition aperture of a cosmetic applicator, for example, an electrostatic airbrush applicator. For some embodiments, a frexel may represent an area of 1/15" to 1/5".

The term skin is used not only to refer to skin as on the surface of the human body, but also to refer more broadly to any human feature that may be enhanced cosmetically, for example, fingernails, hair, and other keratinous surfaces. The term skin includes, but is not limited to, areas of human skin including the face, head, neck, torso, back, legs, arms, hands, and feet.

The term attribute means the local reflectance of skin, the surface morphology of the skin, or both. The term attribute is a subset of the broader term characteristic, which refers to any measurable skin property. The terms "in register in agreement" or "in agreement" mean specifically applying an RMA in register to frexel attributes in a manner to accentuate one or more frexels of a feature such as applying a light RMA to lighten a light skin feature; applying a dark RMA to darken a dark feature; adding red RMA to a red frexel; and applying RMA to a dimple to highlight the dimple. The terms "in register in opposition" or "in opposition" mean specifically applying an RMA in register to frexel attributes in a manner to conceal or cover one or more frexels of a feature such as applying a light RMA to a dark skin feature to lighten the feature; applying a dark RMA to a light feature to darken the skin; adding a green or blue RMA to a red frexel; and applying a light RMA to a portion of a wrinkle to hide the wrinkle.

A "deposition device" is a device that applies an RMA to the skin. In this specification, the deposition device may be a sprayer, including an electrostatic sprayer or airbrush sprayer, a drop control device, or other apparatus. A "deposition element" is a portion of a deposition device that applies an RMA, such as a sprayer, a drop control element, or both. A "scanning and deposition device" scans a portion of the skin and uses scan data to control a deposition of one or more RMA. An example of a drop control element is an inkjet print head where individual droplets are precisely controlled. An example of a non-drop control element is a sprayer. Spray devices are non-drop control techniques where droplets are produced and controlled only in aggregate.

The term reflectance is the ratio, provided as a percentage, of light reflected from a surface to the light impinging on the surface. The terms optical density, or density can refer to a measure of the reflection of the skin. In this specification, an "initial reflectance" reading is an initial reflectance reading from a sensor, before compensating for distance or tilt. An "adjusted reflectance" reading compensates the initial reflectance reading for distance and tilt of a surface from a sensor ring. Adjusted reflectance is a reflectance reading corrected for device height and tilt relative to the skin surface. A "desired density level" is typically a desired level of smoothing for an area of skin, such as threshold for lightening skin, darkening skin, or both. An "average density" over an area of skin may be used as the desired density level. The term "RMA application density" refers to the mass per unit area of RMA applied to a surface.

The term handheld includes devices that are self-contained in a housing that may be held in a hand as well as devices where a housing is tethered to power supply and/or computer.

Implementations of the present disclosure are generally directed to apparatus and methods for providing visibility beneath a deposition head of a device that can be used to deposit RMAs. More particularly, it may be useful to view the target of deposition head, e.g., an inkjet printer head, through the use of sensors and computer analysis of the sensed data, to determine precisely where to deposit a RMA. A problem with a typical ink jet head is that it covers the substrate, e.g., skin, onto which RMA is to be deposited. Consequently, the head can obscure sensing of the substrate, hindering determination of substrate-relevant data that can be used to determined, for example, type, amount, and/or location of RMA that is to be deposited.

Although there are ways to improve the visibility of the target area, e.g., of the substrate underneath the head, it may still be difficult to build a sensing construction that is thinner than a triangular wedge. Consequently, the substrate that is to be printed on might only be viewed at oblique angles, e.g., that "peek" under the edge. Experiments with demos for cosmetic deposition have shown that viewing the skin from an angle, even a small angle, is inefficient for the precise collection of data.

Referring now to FIGS. 1A and 1B, implementations of the present disclosure provide visibility beneath a device 100 that can be used to deposit RMAs, e.g., onto a substrate 103, and more particularly, beneath a deposition head 102 of the device 100. In the depicted example, the device 100 includes one or more cameras 104, and can optionally include respective lenses 106. The device 100 further includes one or more prisms (e.g., prism 108A and prism 108B). In some examples, optical parts, such as prisms 108A and 108B, can be provided from one or more materials, e.g., glass or molded out of plastic, so that their use can be practical, while providing sufficient optical characteristics. In some examples the lenses 106 can be molded integral with the prisms. In some examples, the lenses 106 can be lenses of the respective cameras 104. In some examples, a single camera 104 is provided. In some examples, multiple cameras 104 are provided.

In the depicted example, the cameras 104 are arranged generally perpendicular to the substrate 103, e.g., skin. Despite the relatively steep direct view angles, the respective perspectives of the cameras 104 is not only perpendicular to the skin, but is also telecentric to axes of motion of the device 100. In this sense, telecentric means that the view angles of the substrate 103 are parallel across the field of view, and in the depicted example, parallel to a center line 110, e.g., as though viewed through a telescope from a large distance. Thus, as viewed through a telescope, for example, small differences in viewing distances caused by substrate texture have minimal effect on image size. For imagery, this minimizes the need for parallax correction when stitching images or mapping location. For illumination, this minimizes brightness variation with distance or differences in shadowing across the field, as though from a very distant light source. In some examples, views (images) from both cameras 104 can be merged with software code by rote using constants that are fixed, or "burned" at manufacture. In some examples, there is zero parallax or depth to compensate at the seam between the two images.

In some implementations, the device 100 includes lighting (not shown). In some examples, illuminating lamps (not shown) can be employed as light sources. In some examples, the light sources can be arranged in the same telecentric structure as the cameras 104. Telecentricity reduces hotspots, shadowing, and brightness variation with distance from skin, and off-axis glare. In some examples, a polarizer (not shown) can also be used and can be on either the exit or entrance window, so long as both the light sources and the camera see through it. In some examples, a polarizer film is bonded to the surface so there is only one surface to reflect, not three.

In some examples, with a single camera 104 from only one side, deposition is possible. Self-alignment is more difficult, however, because the immediate result is occluded after the passing of the head. Simulations have shown that even a small systematic (non-random) alignment error can be detrimental to quality. Continuous self-alignment is important to consistently deliver benefit quality. In some cases, a larger random alignment error can be tolerated. An alignment error systematic over a large area integrates to a "drop shadow" look that accentuates defects that need to be suppressed, for example for cosmetic deposition to hide or camouflage such defects.

In some examples, with a single camera 104 from only one side, unidirectional RMA deposition can be achieved, which halves application speed when using a back and forth motion.

In accordance with implementations of the present disclosure, the prism(s) (e.g., prism 108A and prism 108B) can be arranged to fold the view from both sides back to a single camera 104.

In some examples, multiple cameras 104 are provided. For example, low resolution camera chips with a fixed-focus lens are very low cost, a small fraction of total device cost, so that use of two cameras 104 may be practical.

In some implementations, even with two cameras 104, a column-shaped blind spot is present in the middle along the line of deposition. In some examples, this blind spot cannot be revealed while retaining perpendicularity of view angle, because the ink jet nozzles, for example, fill that column. However, because the device 100, and thus the camera(s) 104, move relative to the substrate 103, the blind spot is not problematic to RMA deposition and/or determination of the amount, type and/or location of the RMA that is to be deposited.

In some implementations, use of the prism(s) (e.g., prism 108A and prism 108B) provides multiple advantages. For example, alignment is fixed, e.g., by attachment to a housing of the device, such that an alignment procedure can be avoided during manufacture of the device 100. As another example, because the light path is internal to the prism(s) 108A and 108B, there can be no leakage of dust. As another example, there are only two surfaces to have glare, the in and out windows of the prism(s). Further, if the so-called critical angle can be kept low enough, total internal reflection gives 100.00% reflection off the internal surfaces with no additional treatment, although "silvering" is needed if the reflection angles are too low. In some examples, the "critical angle" is the angle of light approaching from the inside the surface of a solid material, e.g., glass, at which all the light is reflected back in "total internal reflection," e.g., as though the surface were a perfect mirror. In some examples, the "critical angle" occurs at the arcsine of the reciprocal of the index of refraction of the medium when exiting to free space. Reflection is free from interference by dust, although there can be minimal effects from surface-breaking oily contaminates. As a further example, a prism cannot be bent out of alignment, e.g., short of being broken.

In the depicted example, the prism (e.g., prism 108A and/or prism 108B) includes a curved surface 120. In some examples, the curved surface 120 includes a focusing curve and can be generally parabolic. In some examples, the prism (e.g., prism 108A and/or prism 108B) can include a curved surface 122. As depicted in the example of FIG. 1A, light that is reflected from the substrate 103 that is reflected generally parallel to the center line 110, can pass through the prism (e.g., prism 108A and/or prism 108B) to reflect off of the curved surface 120. In some examples, the light can be reflected off the curved surface 120 and can be directed to a focal point, e.g., the lens 106. In this manner, the curved surface 120 can function as a focusing surface to enable a telecentric view of substrate 103 from the perspective of lens 106. In examples including the curved surface 122, light passing into the prism (e.g., prism 108A and/or prism 108B) can be refracted at the curved surface 122 to travel toward the curved surface 120.

In the depicted example, a seal 130, e.g., O-ring, can be provided to seal a space 132 between the head 102 and the prism e.g., prism 108A and/or prism 108B). In this manner, RMA and/or debris can be inhibited from occupying the space 132. In some examples the O-ring reestablishes the seal when the ink jet head and cartridge are replaced when empty. In some examples the O-ring can be an element of a waterproof seal that allows the device to be rinsed in a liquid for cleaning.

In some implementations, the prism(s) 108A and 108B can be provided as a structural core of the device 100. In some examples, the prism(s) 108A and 108B can support other components, e.g., camera(s) 104, lights, printer head 102. In some examples, product covers, called "skins" can be provided, which include surfaces that a user of the device 100 touches/feels/grips when using the device 100. In some examples, skins are attached by molding receivers and/or pegs into the design, e.g., of the skin and/or the device 100. This adds automatic precision alignment of components, sturdiness, and ease of assembly. In some examples, a prism itself can be a uni-body structural frame of the device 100.

In some implementations, the deposition head 102 can be recessed in a gap between prisms, or prism halves in the case of a single prism. In this manner, a short and tightly controlled throw distance that shielded from drafts can be provided. In some examples, such a short and fixed distance exactly matches the needs of ink jet technology, supporting its use to deposit RMAs as discussed herein.

In some implementations, a gap can be provided between the prism(s) 108A and 108B and the substrate 103, e.g., as depicted in FIG. 1A. In some implementations, the prism(s) 108 can directly contact the substrate 103, e.g., enabling the device 100 to be moved lightly over the substrate 103 similar to legacy contact methods of brush delivery of RMAs that is familiar to consumers. In some examples, smearing of RMA by the prism(s) 108A and 108B can be remediated by, for example, use of an oleohobic/hydrophobic repelling coating, use of an RMA having a formulation for minimal smearing in the almost invisibly small quantities of an ink jet dot, instructing users to use the device 100 with a gentle touch, and/or software to view through smearing.

In some examples, effective "ink repelling" coatings are commercially available in thicknesses of 2-4 nm, far less than the wavelength of light. These coatings are effective with almost all inks, and also reduce drag on the skin. Teflon is an example of such chemistry. The formulation of RMAs, along with other constraints, can be provided for quick bonding to the substrate 103, and sliding on the selected coating. In some examples, with respect to a gentle touch, an oblique light can be provided, for example, to reveal contact force by a break in the total internal reflection, e.g., using technology common in biometric fingerprint sensors. In some examples, the contact force can be translated as a sound to indicate contact force to the user to encourage a light touch. In some examples, deposition of RMA can be automatically ceased in response to determining that the contact force is high enough to induce smearing.

In some implementations, small amounts of RMA on the prism(s) 108A and 108B can be separated by software. For example, because the substrate 103 moves relative to the device 100 and the accumulated RMA does not, the accumulated RMA can be separated, such that it does not overtly influence determination of the type, amount and/or location of RMA to be deposited.

Features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A device for selectively applying a reflectance modifying agent (RMA) to an area of skin, the device comprising:
a first camera that is operable to provide images within a first viewing field of the first camera;
a deposition head, the deposition head being configured to selectively deposit the RMA to the area of skin, and being positioned to at least partially obscure the area of skin relative to the first viewing field of the first camera;
a first prism attached to the deposition head, the first prism comprising an ink repelling coating configured to minimize smearing with the RMA and being configured to direct light reflected from the area of skin to the first camera to provide visibility beneath the deposition head and to enable the first camera to generate images of the area of skin within the first viewing field.

2. The device of claim 1, further comprising
a second camera that is operable to provide images, the deposition head being positioned to at least partially obscure the area of skin relative to a second viewing field of the second camera;
a second prism attached to the deposition head, the second prism being configured to direct light reflected from the area of skin to the second camera to enable the second camera to generate images of the area of skin.

3. The device of claim 2, wherein the first camera and the second camera are disposed on opposite sides of the deposition head.

4. The device of claim 1, wherein the first camera is aimed generally parallel to the area of skin.

5. The device of claim 1, wherein the first camera is telecentric to axes of motion of the device.

6. The device of claim 1, further comprising a second prism attached to the deposition head, the second prism being configured to direct light reflected from the area of skin to the first camera to enable the first camera to generate images of the area of skin.

7. The device of claim 1, wherein the first prism comprises a plastic.

8. The device of claim 1, further comprising a lens.

9. The device of claim 8, wherein the lens is molded into the first prism.

10. The device of claim 1, wherein the device comprises a handheld device.

* * * * *